(12) United States Patent
Aubrit et al.

(10) Patent No.: US 11,156,540 B2
(45) Date of Patent: Oct. 26, 2021

(54) DEVICE AND METHOD FOR DETERMINING CHARACTERISTIC PARAMETERS OF THE DIMENSIONS OF NANOPARTICLES

(71) Applicants: Cordouan Technologies, Pessac (FR); Centre National de la Recherche Scientifique, Paris (FR); UNIVERSITE DE BORDEAUX, Bordeaux (FR); INSTITUT POLYTECHNIQUE DE BORDEAUX, Talence (FR)

(72) Inventors: Florian Aubrit, Nanteuil (FR); David Jacob, Talence (FR); Olivier Sandre, Pessac (FR)

(73) Assignees: Cordouan Technologies, Pessac (FR); Centre National de la Recherche Scientifique, Paris (FR); Universite De Bordeaux, Bordeaux (FR); Institut Polytechnique De Bordeaux, Talence (FR)

( * ) Notice: Subject to any disclaimer, the term of this patent is extended or adjusted under 35 U.S.C. 154(b) by 0 days.

(21) Appl. No.: 17/001,825

(22) Filed: Aug. 25, 2020

(65) Prior Publication Data

US 2021/0063296 A1 Mar. 4, 2021

(30) Foreign Application Priority Data

Sep. 3, 2019 (FR) ...................................... 1909692

(51) Int. Cl.
*G01N 15/02* (2006.01)
*G01N 15/14* (2006.01)
(Continued)

(52) U.S. Cl.
CPC ..... *G01N 15/0211* (2013.01); *G01N 15/1436* (2013.01); *G01N 21/51* (2013.01); *G01N 2015/0053* (2013.01)

(58) Field of Classification Search
CPC .......... G01N 15/0211; G01N 15/1436; G01N 21/51; G01N 2015/0053;
(Continued)

(56) References Cited

U.S. PATENT DOCUMENTS

| 4,679,939 | A | * | 7/1987 | Curry | ................. | G01N 15/0205 356/336 |
| 4,764,013 | A | * | 8/1988 | Johnston | ............ | G01N 15/0205 356/338 |

(Continued)

OTHER PUBLICATIONS

Rodriguez-Fernández, J. et al.; "Dynamic Light Scattering of Short Au Rods with Low Aspect Ratios;" American Chemical Society; 2007; pp. 5020-5025 (6 pages).

(Continued)

*Primary Examiner* — Roy M Punnoose
(74) *Attorney, Agent, or Firm* — Osha Bergman Watanabe & Burton LLP (57) ABSTRACT

A device is disclosed for determining characteristic parameters of the dimensions of nanoparticles in suspension in a liquid. The device emits an incident light beam that is linearly polarized along a polarization axis; a detecting unit comprising a measurement arm that is rotatable with respect to an axis of rotation, the detecting unit comprising first and second detection channels that are separated by a polarization-splitting element arranged in the measurement arm; a fixed sample holder receives a container of cylindrical symmetry of the sample, an axis of symmetry of the container being coincident with the axis of rotation of the measurement arm; and a control unit. The polarization-splitting element of the measurement arm is configured to (Continued)

simultaneously send, over each of the first and second detection channels, respectively, a first and second polarized component of the beam scattered by the sample.

13 Claims, 6 Drawing Sheets (51) Int. Cl.
*G01N 21/51* (2006.01)
*G01N 15/00* (2006.01)

(58) Field of Classification Search
CPC ... G01N 2021/4792; G01N 2015/0294; G01N 2015/0222; G01N 2015/0038
USPC .......................................................... 356/336
See application file for complete search history.

(56) References Cited

U.S. PATENT DOCUMENTS

| | | | | |
|---|---|---|---|---|
| 4,953,978 A | * | 9/1990 | Bott | G01N 15/0211 356/336 |
| 5,113,083 A | * | 5/1992 | Oka | G01S 17/58 250/574 |
| 5,956,139 A | * | 9/1999 | Meyer | G01N 15/0211 356/338 |
| 6,100,976 A | * | 8/2000 | Ackerson | G01N 15/0211 356/336 |
| 6,721,051 B2 | * | 4/2004 | Menguc et al. | G01N 15/0211 356/367 |
| 6,859,276 B2 | * | 2/2005 | Xu | G01N 15/0211 356/336 |
| 8,625,093 B2 | * | 1/2014 | Yamaguchi | G01N 21/21 356/336 |
| 8,854,621 B1 | | 10/2014 | Muschol | |
| 9,068,978 B2 | * | 6/2015 | Bruckl | B82Y 30/00 |
| 2010/0105026 A1 | * | 4/2010 | Bruckl | B82Y 15/00 435/5 |
| 2020/0225142 A1 | * | 7/2020 | Potenza | G01N 15/1459 |

OTHER PUBLICATIONS

Levin, A. et al.; "Nonspherical nanoparticles characterization using partially depolarized dynamic light scattering;" SPIE; Jun. 2015; vol. 9526, 95260P (9 pages).

Ohsawa T. et al.; "FFT Method of Dynamic Light Scattering for Particle Size Diagnostics in Luminous Flames;" Combustion and Flame; 1983; pp. 135-139 (5 pages).

* cited by examiner

DEVICE AND METHOD FOR DETERMINING CHARACTERISTIC PARAMETERS OF THE DIMENSIONS OF NANOPARTICLES

The present invention relates to a device and method for determining characteristic parameters of the dimensions of nanoparticles via the scattering of light, and more particularly relates to the characterization of anisotropic nanoparticles in suspension in a liquid medium.

Prior Art

The use of nanoparticles has become widespread in industrial processes, whether in the pharmaceutical industry, the cosmetics industry, the materials industry, or the electronics industry. The properties of nanoparticles are directly related to their structure (size, morphology, composition), and hence there is a need to form increasingly complex nanoparticles in order to best exploit their potential.

In particular, anisotropic nanoparticles (e.g. elongate "nanorod" nanoparticles) are the subject of increasing study. It may for example be a question of certain quantum-dot structures (luminescent nanoparticles, which are widely used in the audio-visual display field), of biomass derivatives (especially cellulose nanowhiskers), which are prized in the current ecological sustainability context, of even of various nano-capsules manufactured to transport drugs in the human body and able to adopt tubular morphologies under certain pH and temperature conditions.

It is therefore necessary to develop new techniques allowing a rapid and precise characterization of these structures.

Dynamic light scattering (DLS) is one of the leading techniques for the study of nanoparticles, allowing a nanoparticle-size value and information on polydispersity (i.e. classes of populations of nanoparticles of a given size range) to be rapidly obtained. However, the DLS technique generally used, which consists in studying the scattering of light at one given angle, only allows spherical nanoparticles to be characterized or, potentially, approximate information on the main "hydrodynamic" dimension of non-spherical nano-objects to be obtained (i.e. the diameter of an equivalent sphere ofidentical translational diffusion constant).

The U.S. Pat. No. 8,854,621 [Ref. 1] more specifically addresses the characterization of anisotropic nanoparticles. More precisely, Ref. 1 describes a method for determining relaxation rates of scattered light ("translational" and "rotational" relaxation rates) when the sample formed from nanoparticles in suspension in a liquid is illuminated by a beam of linearly polarized light. More precisely, the scattered light is collected at 90° direction angle from the incident illuminating beam, through a rotatable Glan-Thompson prism that acts as a polarizer (analyzer). The rotatable Glan-Thompson prism makes it possible to select a polarization aligned with an axis parallel to the incident polarization (analysis of so-called "VV polarized" scattered light where V stands for "vertical") or with a perpendicular axis (analysis of so-called "VH-depolarized" scattered light where H stands for "horizontal"). The translational and rotational relaxation rates are determined from a (multi) exponential decay fiting procedure of both of the autocorrelation functions of the scattered VV and VH light intensities, respectively. It is possible, from these relaxation rates, to determine a characteristic parameter of the dimensions of the anisotropic nanoparticles, such as for example an aspect ratio (defined as the ratio between the length and width of the object). This method is also described in J. Rodriguez-Fernandez et al. [Ref. 2]. In A. D. Levin et al [Ref. 3], an improved technique is proposed, based on the use of depolarized light between the VV and VH states. One objective of the present description is to provide an improved apparatus and method allowing, with respect to the prior art described above, measurement rapidity and accuracy to be increased.

SUMMARY OF THE INVENTION

According to a first aspect, the present description relates to a device for determining characteristic parameters of the dimensions of nanoparticles in suspension in a liquid medium, comprising:

light-emitting means configured to emit an incident light beam that is linearly polarized along a polarization axis;

a detecting unit comprising a measurement arm that is rotatable with respect to an axis of rotation, said detecting unit being configured to detect a plurality of scattered beams by the sample, at a plurality of scattering angles, when the sample is illuminated by the incident beam, and comprising a first detection channel with a first optical axis and a second detection channel with a second optical axis, the first and second detection channels being separated by a polarization-splitting element arranged in said measurement arm;

a fixed sample holder, configured to receive a transparent container of cylindrical symmetry, inside of which is located a sample of said nanoparticles in a liquid suspension, the sample holder being arranged such that, in operation, an axis of symmetry of the container is coincident with the axis of rotation of the measurement arm;

a control unit.

According to the present description, the polarization-splitting element of the measurement arm is configured to simultaneously send, for each scattering angle of the plurality of scattering angles:

in the first detection channel, a first polarized component of the beam scattered at said scattering angle, said first component being linearly polarized with a polarization axis collinear with said polarization axis of the incident beam.

in the second detection channel, a second polarized component of the beam scattered at said scattering angle, said second component being linearly polarized with a polarization axis perpendicular to the polarization axis of the incident beam.

Moreover, the control unit is configured to determine, from signals resulting from the polarized components detected in each of the detection channels as a function of time, and for the plurality of scattering angles, at least two characteristic parameters of the dimensions of the nanoparticles.

In the present description, the scattering angle is defined as the geometric angle, in a plane normal to the axis of symmetry of the container, between the direction of propagation of the incident beam and the direction of said first optical axis of said first detection channel.

In the present description, the nanoparticles are defined as nano-objects half of which, in a group of 100 nano-objects, have at least one dimension smaller than 100 nm. The nanoparticles may comprise metal oxides, metals, semimetals, inorganic earths, polymers, carboneous or organic nano-objects functionalized with active molecules, crystals, molecular assemblies, surfactant self-assemblies (spherical micelles, cylindrical micelles, discoid micelles, etc.) or polymer self-assemblies (polymer micelles), vesicles, biological viruses, bacteria, biological macromolecules (e.g. proteins), quantum dots, organic or inorganic nanotubes, clay nano-flakes, nano-sheets (graphene or graphene oxide for example), nano-drops of microemulsion or nanoemulsion (for example oil in water or water in oil), chains of mutually aligned nanocrystals, etc.

The nanoparticles dispersed in a liquid medium may form colloidal suspensions when the dispersion is thermodynamically stable or at least metastable.

According to one or more exemplary embodiments, the characteristic parameters of the dimensions of the nanoparticles comprise at least two parameters among: a length, a width, an aspect ratio, a diameter (case of discoidal, spherical or cylindrical nanoparticles), a height (case of nanoparticles of prismatic shape with e.g. a triangular basis), a thickness (case of a platelet), a major-axis length, a minor-axis length (case of a nanoparticle of ellipsoidal shape).

The applicants have shown that the device thus described, because of the combination of its structural features, allows, with respect to known prior-art devices, two so-called VV- and VH-polarized components of the beam scattered by the same region of the sample to be measured simultaneously, this allowing accuracy and rapidity to beimproved.

Moreover, the time saving achieved by simultaneously measuring both polarized components simultaneously offers the possibility of kinetic measurement of the growth of anisotropic nanoparticles by working at a given scattering angle.

Further, the multi-angle measurements thus carried out allows accuracy to be increased and potential measurement artifacts to be avoided.

According to one or more exemplary embodiments, the plurality of scattering angles is comprised in a range of scattering angles extending from 20° to 160°.

According to one or more exemplary embodiments, an increment step between the angles of said plurality of scattering angles is comprised between 5° and 45°.

The applicants have shown that the studied range of angles)(20°-160° allows the accuracy of the measurement to be improved by avoiding certain artifacts that are detrimental to the measurement.

The increment step of between 5° and 45° is chosen by a compromise between the rapidity of the measurement (measurement time) and the desired accuracy (number of measurement points).

According to one or more exemplary embodiments, the rotation of said measurement arm is automated and controlled by said control unit, thus limiting manual handling that is possibly a source of inaccuracy. For example, the rotation of the measurement arm is automated by means of a step-by-step motor.

According to one or more exemplary embodiments, each of the first and second detection channels comprises a detector, the detector being able, for example, and non-limitingly, to be: an avalanche photodiode (APD) or a photomultiplier tube (PMT).

According to one or more exemplary embodiments, said first and second detection channels are optical fibers. This allows the detectors to be located remotely with the control unit, i.e. outside of the rotatable measurement arm, keeping the device compact and robust.

According to one or more exemplary embodiments, each detection channel thus comprises an optical fibre that is single-mode at the wavelength of the light source, said fibre being connected to a collecting optical collimator, said collimator defining the optical axis of the detection channel.

According to one or more exemplary embodiments, the optical axes of the detection channels make an angle comprised between 10° and 90°; for example, the first and second optical axes are perpendicular.

According to one or more exemplary embodiments, the light-emitting means comprise a laser source, such as a laser light emitting diode, a solid state laser or a gas laser.

Specifically, a laser source has a spatial and temporal coherence and an optical power sufficient for accurate measurements of the scattered light.

The laser source is for example continuous-wave, linearly polarized and preferably a fibre-optic coupled laser with a focusing element (collimator) and, where appropriate, an external polarizer to improve signal-to-noise ratio (contrast expressed in decibels).

According to one or more exemplary embodiments, the polarization-splitting element comprises a Glan-Thomson, Glan-Taylor or Wollaston prism or biprism.

According to one or more exemplary embodiments, the sample holder is furthermore heat-conducting and comprises a temperature-controlling element in order to keep the temperature of the sample controlled. For example, the temperature-controlling element comprises a thermoelectric element or a thermostated chamber, for example a circulation chamber connected to a thermostated bath.

According to one or more exemplary embodiments, the sample holder is configured to receive a plurality of containers of cylindrical symmetry, of different sizes and/or volumes. It is thus possible to avoid to transfer the sample in dedicated container that is needless or that is even detrimental to the sample The description relates, according to a second aspect, to methods implemented by means of examples of devices according to the first aspect.

Thus, according to a second aspect, the description relates to a method for determining characteristic parameters of the dimensions of nanoparticles in suspension in a liquid medium, comprising:

arranging a sample of said nanoparticles in liquid suspension in a transparent container of cylindrical symmetry;
illuminating said sample by means of an incident light beam that is linearly polarized along a polarization axis;
simultaneously detecting, by means of a measurement arm that is rotatable with respect to an axis of rotation that is coincident with an axis of symmetry of the container, for each scattering angle of a plurality of scattering angles, two polarized components of the beam scattered by the sample at said scattering angle, the two polarized components respectively having two polarization axes that are perpendicular, one of said polarization axes being collinear with said polarization axis of the incident beam;
determining, from signals corresponding to the detected polarized components, as a function of time, for said plurality of scattering angles, at least two characteristic parameters of the dimensions of the nanoparticles.

According to one or more exemplary embodiments, the characteristic parameters of the dimensions of the nanoparticles comprise at least two parameters among: a length, a width, an aspect ratio, a diameter (case of discoidal, spherical or cylindrical nanoparticles), a height (case of nanoparticles of prismatic shape with eg a triangular basis), a thickness (case of a platelet), a major-axis length and/or a minor-axis length (case of a nanoparticle of ellipsoidal shape).

According to one or more exemplary embodiments, said signals correspond to polarized components detected during a set measurement duration, for example a duration comprised between 5 s and 1 min.

According to one or more exemplary embodiments, the plurality of scattering angles is comprised in a range of scattering angles extending from 20° to 160°.

According to one or more exemplary embodiments, the increment step of the plurality of scattering angles is comprised between 5° and 45°.

According to one or more exemplary embodiments, the determination of at least two characteristic parameters of the dimensions of the nano-objects comprises determining two translational and rotational scattering coefficients.

According to one or more exemplary embodiments, the determination of the two translational and rotational scattering coefficients comprises, for each scattering angle, determining two translational and rotational relaxation rates.

According to one or more exemplary embodiments, the determination of two translational and rotational relaxation rates, for said scattering angle, comprises:
  determining two correlograms corresponding to the fluctuations in the intensity of said two polarized components as a function of time;
  determining, from said correlograms, said translational and rotational relaxation rates.

According to one or more exemplary embodiments, the two translational and rotational relaxation rates are determined from a fit of curves respectively resulting from the sum and subtraction of the two correlograms. One of these curves (the sum of the correlograms) allows the sum of the relaxation rates to be displayed and the other of these curves (the subtraction) allows the translational relaxion rate alone to be displayed. To determine the two translational and rotational relaxation rates, it is also possible to use, in a known way, the width of peaks in spectra obtained by fast Fourier transform (FFT) of the two polarized components as a function of time [Ref. 4].

According to one or more exemplary embodiments, the translational and rotational scattering coefficients are determined for each scattering angle of the plurality of scattering angles.

According to one or more exemplary embodiments, the translational and rotational scattering coefficients are determined graphically from a plurality of translational and rotational relaxation rates determined for a plurality of scattering angles.

According to one or more exemplary embodiments, the determination of said at least two characteristic parameters of the dimensions of the nanoparticles comprises determining a length and an aspect ratio of said nanoparticles, computed via an empirical inversion law from theoretical formulae of said translational and rotational scattering coefficients.

According to one or more exemplary embodiments, said empirical law is dependent on the ratio of the translational scattering coefficient to the cube root of the rotational scattering coefficient.

The applicants have thus demonstrated that, especially in the case of nanoparticles of cylindrical symmetry, the above change of variables allows said length and aspect ratio to be determined directly.

More precisely, the change of variables comprises determining X, Y, with $X=D_t/(\sqrt[3]{D_r})$, where $D_t$ is the translational scattering coefficient and $D_r$ is the rotational scattering coefficient, and Y is defined as the ratio of the absolute temperature (in Kelvin) to the dynamic viscosity of the carrier liquid of the suspension (expressed in milliPascal per second or centipoise).

Thus, in the case of cylindrical nanoparticles, the length (L) and the aspect ratio (RF=L/Φ where Φ is the diameter) may be computed from the following empirical formulae, which were determined numerically by computation from theoretical formulae (equations of Broersma's model, which are mentioned in [Ref 1] and [Ref 2]) via minimization using the least-squares method for lengths L comprised between 2 nm and 2 μm and for aspect ratios RF between 2 and 20:

$$L=(a\times Y^{4/3})/(b\times Y - c\times Y^{1/3}\times X)/D_r^{1/3}$$

$$RF=L/\Phi=e\times\exp(f\times Y^{-2/3}\times X) \quad \text{[Math 1]}$$

where X is the ratio of the translational scattering coefficient to the cube root of the rotational scattering coefficient and Y is the ratio of the absolute temperature (in Kelvin) to the viscosity of the carrier liquid (in milliPascal per second or centipoise), exp is the usual mathematical function and a, b, c, e and f are constants independent of the sample and of the experimental conditions (eg temperature) and the values of which are the following:

$$a=1.29714\times10^{-32}$$

$$b=1.33796\times10^{-24}$$

$$c=6.69743\times10^{-9}$$

$$e=3.35889\times10^{-2}$$

$$f=4.12937\times10^{16} \quad \text{[Math 2]}$$

BRIEF DESCRIPTION OF THE FIGURES

Other advantages and features of the invention will become apparent on reading the description, which is illustrated by the following figures.

DETAILED DESCRIPTION OF THE INVENTION

Figure 1:
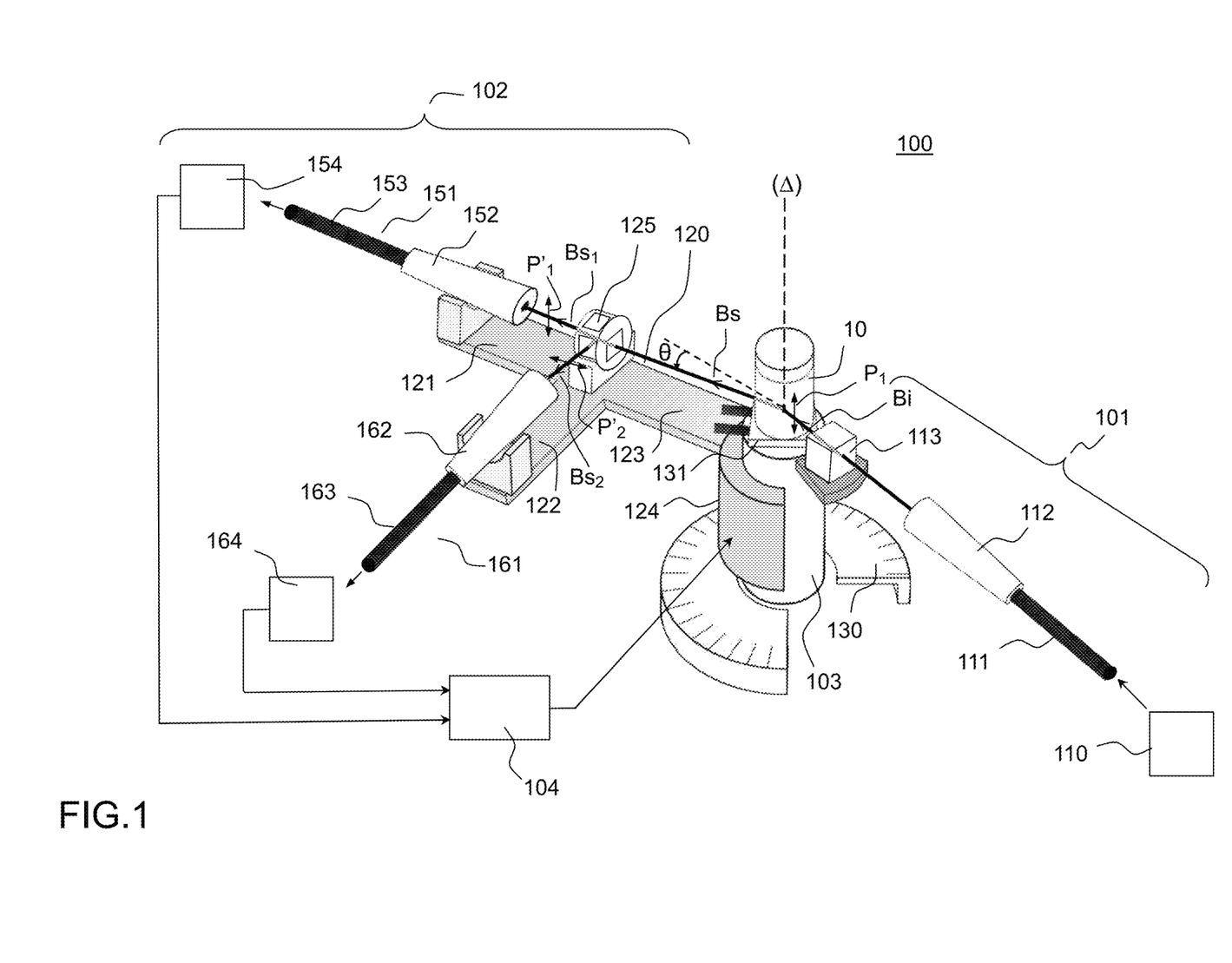
FIG. 1 shows a schematic of a device for determining characteristic parameters of the dimensions of nanoparticles, according to one exemplary embodiment.

FIG. 1 shows a schematic of a device 100 for determining characteristic parameters of the dimensions of nanoparticles, according to one exemplary embodiment.

The device comprises light-emitting means 101 configured to emit an incident light beam $B_i$ that is linearly polarized along a polarization axis $P_1$.

The light-emitting means 101 for example comprises a fibre-laser source 111 of given wavelength, connected to an optical collimator 112 and an (optional) polarizer 113.

The device 100 moreover comprises a detecting unit 102, especially with a measurement arm 120 that is rotatable with respect to an axis of rotation Δ, a fixed sample holder 103 and a control unit 104.

The sample holder 103 is configured to receive a transparent container 10 of cylindrical symmetry, inside of which is found a sample of said nanoparticles in liquid suspension. It is arranged such that, in operation, an axis of symmetry of the container is coincident with the axis of rotation of the measurement arm.

In practice, any optically transparent flask of cylindrical geometry suitable for receiving a clear (non-opaque), homogenous suspension of nano-objects that is sufficiently diluted for the scattered signal not to be too intense and not to adversely affect the scattering regime will possibly be used as container. Any agitation will be avoided during the measurement. The sample holder for example comprises a base (of diameter possibly able to be tailored to the flask used) holding the flask of the sample immobile with respect to the rotation of the arm, and a temperature-controlled chamber allowing the temperature locally around the sample to be precisely controlled. The (optional) element 130 is a circular protractor that is fixed and centred on the motorized turntable 124, allowing the angle between the detection arm (i.e., the scattering angle) and the direction of the incident laser beam to be checked directly. The scattering angle may be controlled from a software interface of the control unit.

The detecting unit 102 is configured in this example for optical detection of a plurality of beams respectively scattered at a plurality of scattering angles θ.

More precisely, the detecting unit comprises a polarization-splitting element 125 arranged on the measurement arm 120 and configured to simultaneously send, over a first detection channel 151 and over a second detection channel 161, respectively, two polarized components $B_{S1}$, $B_{S2}$ of a beam $B_S$ scattered by the sample when it is illuminated by the incident beam. The two detection channels respectively comprise a first optical axis and a second optical axis.

The polarization-splitting element 125 for example comprises a polarization-splitting biprism that steers the beam $BS_1$ of same polarization as the incident beam into the continuity of the scattered beam (first detection channel) and the beam $BS_2$ of polarization perpendicular to that of the incident beam in a direction normal to that of the scattered beam (second detection channel). A device (cradle-receptacle) allowing the rotation and centrality of the cube to be adjusted in order to best optimize the polarization selection in the continuity of and normal to the scattered beam. Thus, the polarization-splitting element makes it possible to form, in each of the detection channels 151, 161, components that are polarized along two perpendicular polarization axes ($P'_1$, $P'_2$), including an axis $P'_1$ collinear with said axis $P_1$.

In the example of FIG. 1, the detecting unit 102 is an optical-fibre detecting unit, and comprises, in each detection channel 151, 161, collimators 152, 162 of the optical fibres that are single-mode at the wavelength of the laser 153 and 163 and detectors 154 and 164, for example photon-counting units (APD) connected to the optical fibres, respectively.

In operation, the control unit 104 receives the signals emitted by each of the detectors 154, 164 and determines, as is described below in more detail, from polarized components detected in each of the detection channels, at least two characteristic parameters of the dimensions of the nanoparticles. In particular, the control unit determines signals (correlograms for example) corresponding to fluctuations in the intensity as a function of time of the polarized components of the scattered light beam. The control unit also controls the motorized turntable that allows the detection angle of the scattered light to be adjusted.

In the rest of the description, for the sake of simplicity, the correlogram corresponding to the component $B_{S1}$ of the scattered beam, which component is polarized with a polarization axis $P'_1$ collinear with the polarization axis $P_1$ of the incident polarized beam $B_i$, will be denoted VV, and the correlogram corresponding to the component $B_{S2}$ of the scattered beam, which component is polarized with a polarization axis $P'_2$ perpendicular to the polarization axis $P_1$ of the incident polarized beam $B_i$, will be denoted VH.

Generally, the control unit 104 to which reference is made in the present description may comprise one or more physical entities, for example one or more computers. When, in the present description, reference is made to computing or processing steps that are carried out especially with a view to implementing steps of a method, it should be understood that each computing or processing step may be carried out by software, hardware, firmware, microcode or any suitable combination of these technologies. When a piece of software is used, each computing or processing step may be implemented via computer-program instructions or software code. These instructions may be stored or transmitted to a storage medium that is readable by the control unit and/or be executed by the control unit in order to implement these computing or processing steps.

In the example of FIG. 1, the measurement arm 120 comprises three branches including a first branch 121 for holding the elements of the first measurement channel 151, especially an optical collimator/collector 152 connected to a single-mode fibre 153 and a second branch 122 for holding the elements of the second measurement channel 161, especially an optical collimator/collector 162 connected to a single-mode fibre 163. It moreover comprises a third branch 123 for connection to a cylinder 124 that is rotatable with respect to the axis of rotation, and the rotation of which is controlled by a stepper motor that is controlled by the control unit 104.

The holding arm is designed so as to be and remain planar and rigid in order, thus, to guarantee the alignment of all the components even during the rotation. Fastening means allow these elements to be kept in place.

Typically, in operation, the rotation of the measurement arm will possibly be controlled such as to acquire polarized components for a plurality of scattered beams corresponding to scattering angles comprised between 20° and 160°, with an increment for example comprised between 5° and 45°.

Figure 2A:
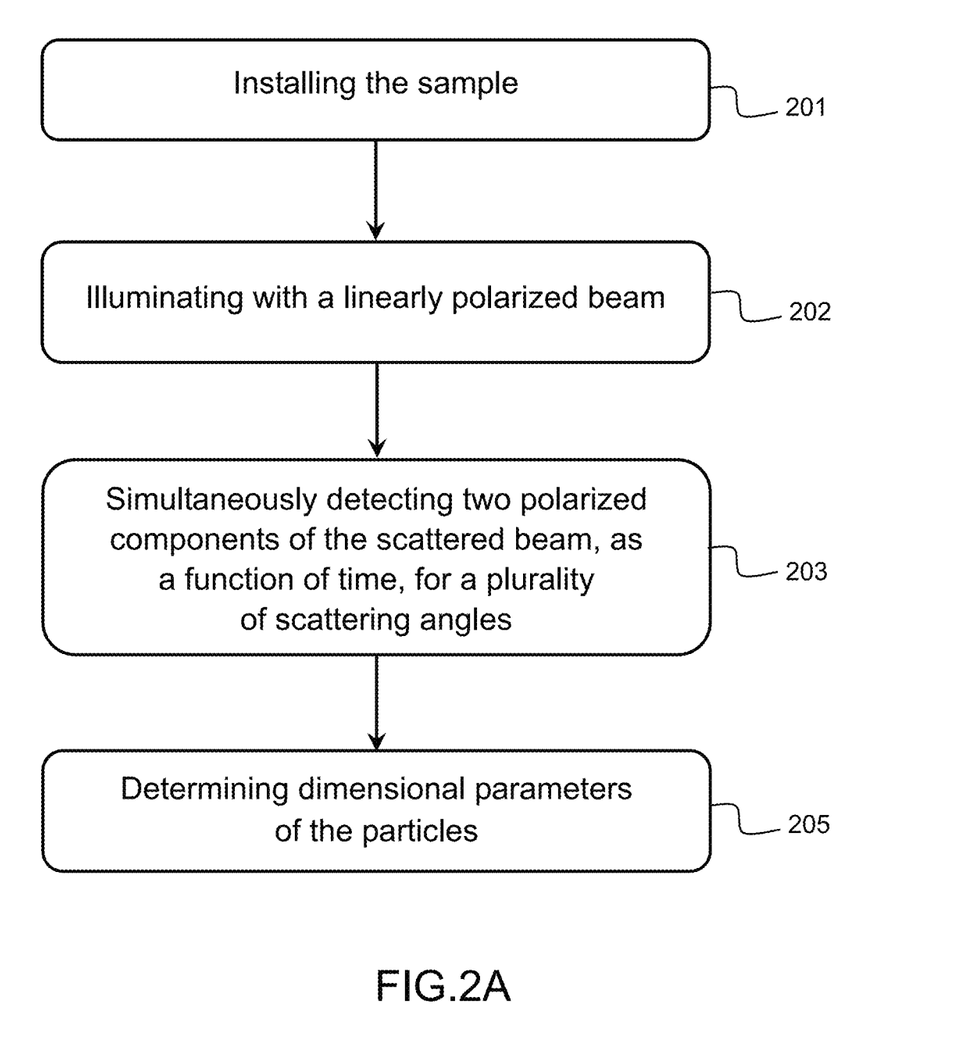
FIG. 2A shows a flowchart of one example method for determining characteristic parameters of the dimensions of nanoparticles, according to one exemplary embodiment.
Figure 2B:
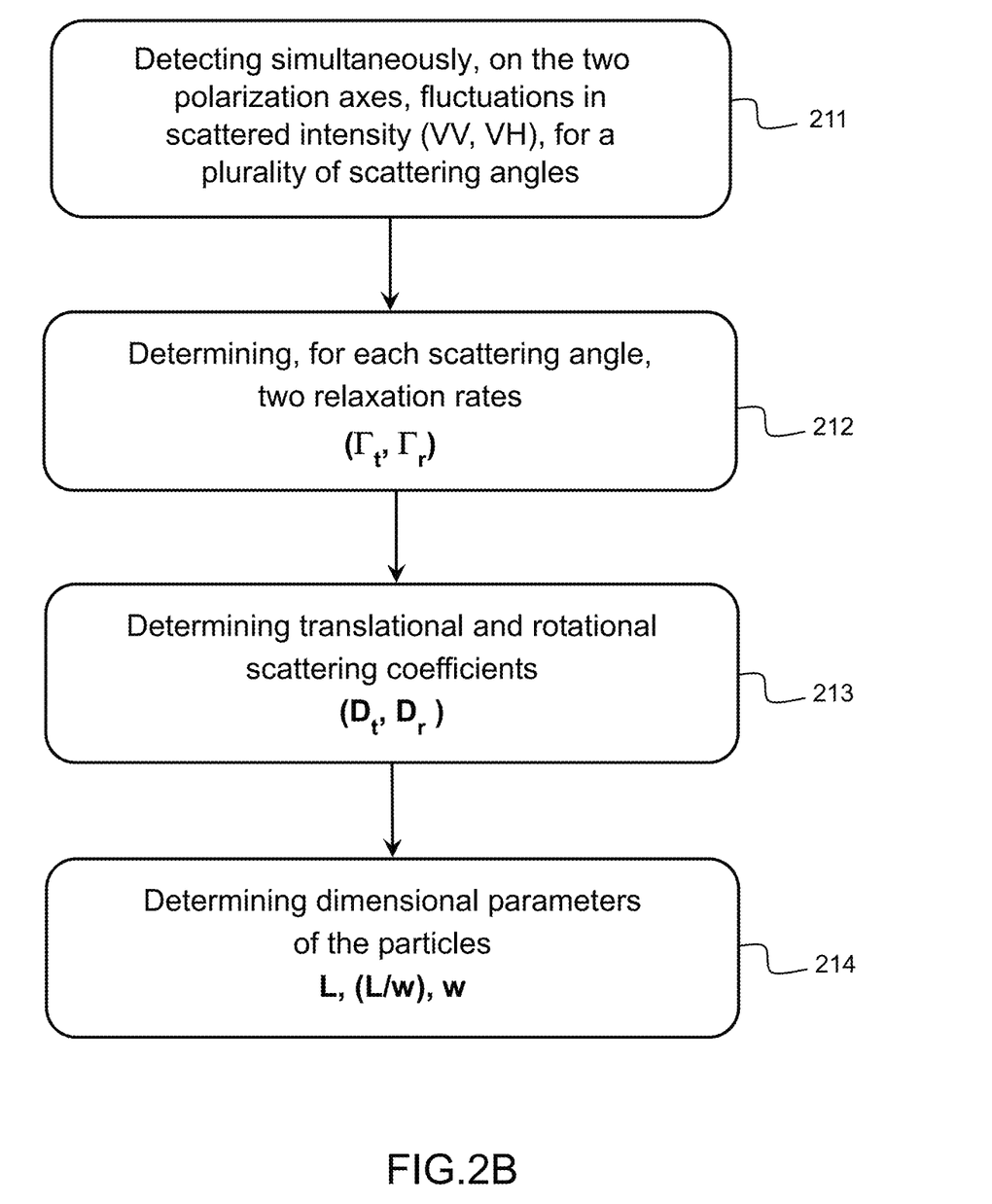
FIG. 2B shows a flowchart of a step of a method such as described in FIG. 2A, according to one exemplary embodiment.

FIGS. 2A and 2B show, via flowcharts, exemplary methods for determining characteristic parameters of the dimensions of nanoparticles, according to exemplary embodiments. The methods may for example be implemented by means of a device such as described in FIG. 1.

The method illustrated in FIG. 2 thus comprises arranging 201 the sample of the nanoparticles in suspension in the container 10 (FIG. 1), illuminating 202 the sample by means of the linearly polarized incident beam $B_i$ and simultaneously detecting 203 the polarized components $B_{S1}$, $B_{S2}$ of the scattered beam, over time, for a plurality of scattering angles θ.

The scattering angle θ is defined as the angle made in a plane normal to the axis of symmetry of the container, between the propagation direction of the incident beam $B_i$ and the direction of said first optical axis of said first detection channel (direction of propagation of the scattered beam $B_S$).

On the basis of the signals thus acquired, characteristic parameters of the dimensions of the nanoparticles are determined (step 204). The parameters for example comprise a length, a width and an aspect ratio of the nanoparticles.

FIG. 2B illustrates in more detail steps of an exemplary method aiming to determine the characteristic parameters of the dimensions of the nanoparticles.

FIGS. 3A to 3D and 4 illustrate, via experimental curves, steps of the method thus described.

For FIGS. 3A to 3D and 4, the studied nanoparticles are gold nanorods in suspension in water. The volume of the container is 5 mL and that of the sample 2 to 3 mL. In particular, to obtain the experimental curves, a device such as illustrated in FIG. 1 was used. The source comprises a laser of 635 nm wavelength, and the rotation of the measurement arm is motorized with a view to detecting scattered beams at angles comprised between 30° and 120° with an increment of 10°.

The method comprises, in a first step 211, and for each scattering angle, determining two correlograms of the VV and VH components, i.e. signals corresponding to the fluctuations in the intensity of the two polarized components $BS_1$, $BS_2$ as a function of time.

The correlograms are determined by autocorrelation of the signal with itself.

Figure 3A:
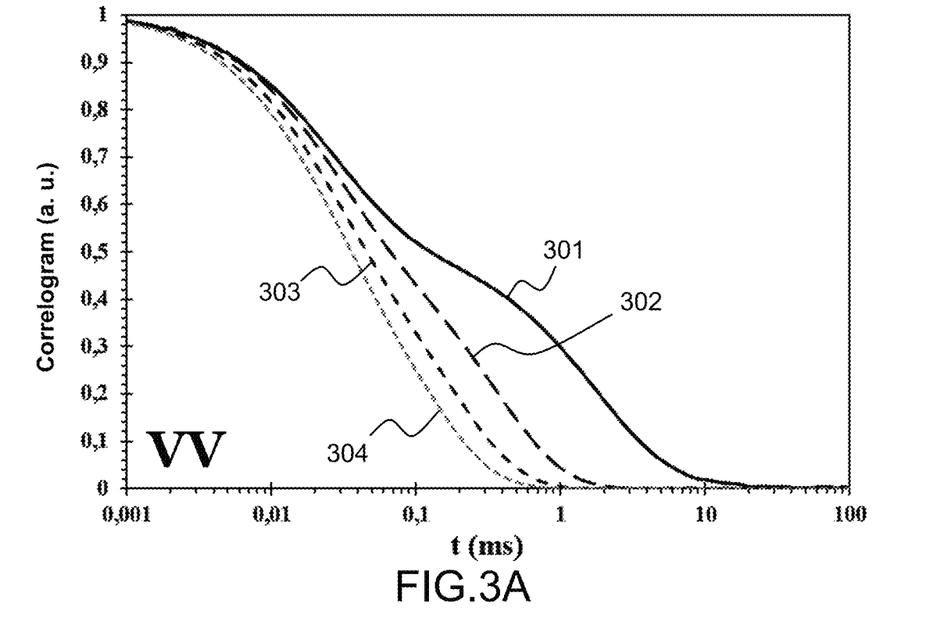
FIG. 3A shows an experimental graph illustrating 4 correlograms of a VV-polarized component of a beam scattered by a sample of gold nano-rods suspended in water, for 4 scattering angles.

By way of illustration, FIG. 3A thus illustrates 4 correlograms of a component of a scattered beam polarized along the same polarization axis as the incident beam (VV) for 4 scattering angles, respectively. Thus, the correlograms 301, 302, 303, 304 correspond to scattering angles of 30°, 60°, 90°, 120°, respectively.

Figure 3B:
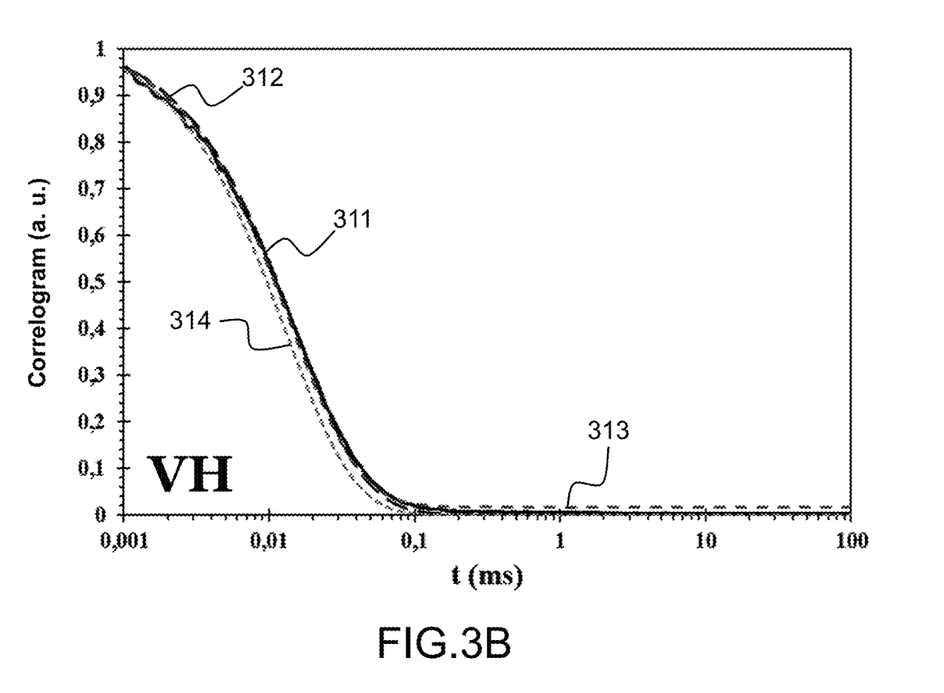
FIG. 3B shows an experimental graph illustrating 4 correlograms of a VH-polarized component of a beam scattered by the same sample as that used for FIG. 3A, for the same scattering angles.

In the same way, FIG. 3B illustrates 4 correlograms of a component of the same scattered beams as in FIG. 3A, but polarized along a polarization axis perpendicular to that of the incident beam (VH). Thus, the correlograms 311, 312, 313, 314 correspond to scattering angles of 30°, 60°, 90°, 120°, respectively.

It will be noted that, in FIGS. 3A and 3B, only 4 correlograms have been shown, for the sake of legibility, but in practice measurements are taken for about ten scattering angles. As may be seen in FIGS. 3A and 3B, it is possible to track the variation in the signal as a function of the detection angle. Whereas the correlogram measured in VH configuration remains unchanged (because the sum of the relaxation rates $\Gamma_t+\Gamma_r$ is dominated $\Gamma_r$ which is independent of the scattering vector and therefore of the angle), the correlogram measured in VV configuration contains the second relaxation rate (the translational rate, $\Gamma_t$) and varies with the different scattering angles/vector (because $\Gamma_t$ is proportional to $q^2$, square of the modulus of the scattering vector, and therefore to the angle), in accordance with theory.

The method comprises, in a second step 212, and for each scattering angle, determining 212, from the VV and VH correlograms, two relaxation rates, a translational relaxation rate $\Gamma_t$ and a rotational relaxation rate $\Gamma_r$.

Figure 3C:
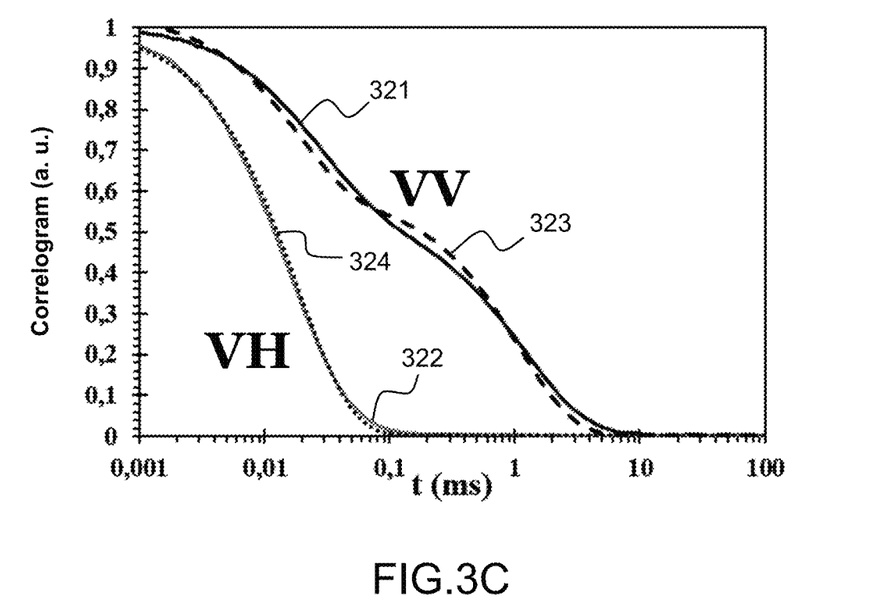
FIG. 3C shows an experimental graph illustrating 2 correlograms respectively of a VV-polarized component and of a VH-polarized component of a beam scattered by the same sample as that used for FIG. 3A, for a scattering angle of 35°, and fits of the experimental curves.

To do this, as illustrated in FIG. 3C, the correlograms 321, 322, obtained at a given scattering angle (here)35° from the measurements in VV and VH configuration respectively (or the curves corresponding to their sum and subtraction) are fitted in a known way with decreasing exponential functions and sums of decreasing exponentials (curves 323, 324), using the sum of the relaxation rates and the translational relaxation rate as parameters (see [Ref.1]). These relaxation rates are then used in the rest of the analysis.

Figure 3D:
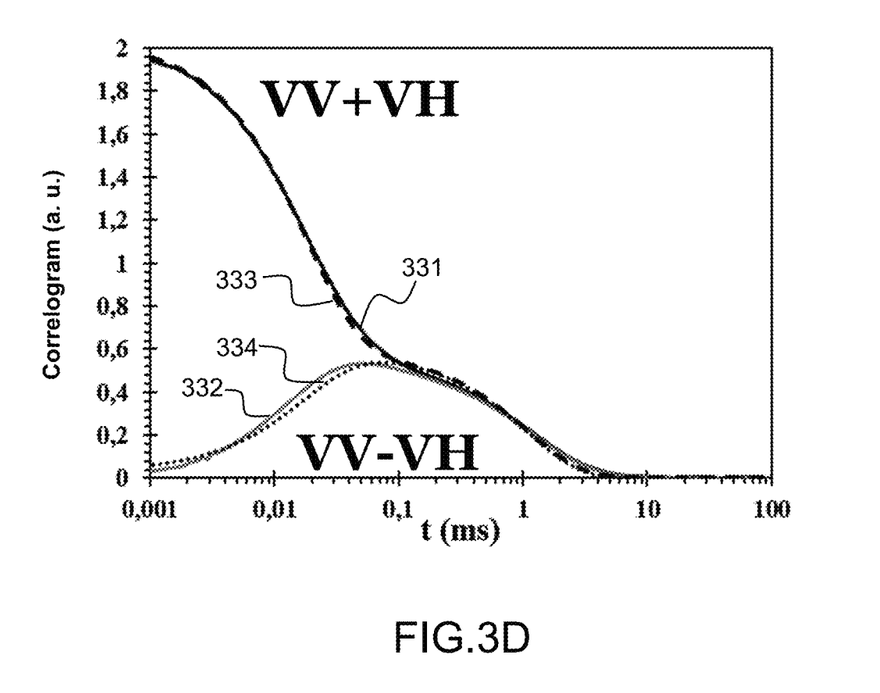
FIG. 3D shows an experimental graph respectively illustrating the sum and the subtraction of the 2 correlograms illustrated in FIG. 3C and fits of the curves thus computed.

It will be noted that, as illustrated in FIG. 3D, the fits (curves 333, 334) of the sum of the correlograms (VV+VH) (curve 331) and of the subtraction (VV-VH) (curve 332), respectively, allow a better accuracy to be obtained for the value of the sum of the relaxation rates ($\Gamma_t+\Gamma_r$) and for the translational relaxation rate ($\Gamma_t$), respectively. The method then comprises, in a step 213, determining, from the two translational and rotational relaxation rates $\Gamma_t$, $\Gamma_r$ obtained for the plurality of scattering angles, two translational and rotational scattering coefficients $D_t$, $D_r$.

The translational and rotational scattering coefficients may be determined using two methods from the translational and rotational relaxation rates.

In a first method, these coefficients are computed for each angle using the following relationships:

$$D_t=\Gamma_t/q^2 \quad \text{[Math 3]}$$

$D_r=\Gamma_r/6$ where q is the modulus of the scattering vector defined by:

$$q = \frac{4\pi n_0}{\lambda}\sin\theta/2 \quad \text{[Math 4]}$$

with λ the wavelength of the laser source, $n_0$ the optical refractive index of the continuous phase (liquid) of the suspension, and θ the scattering angle.

Figure 4:
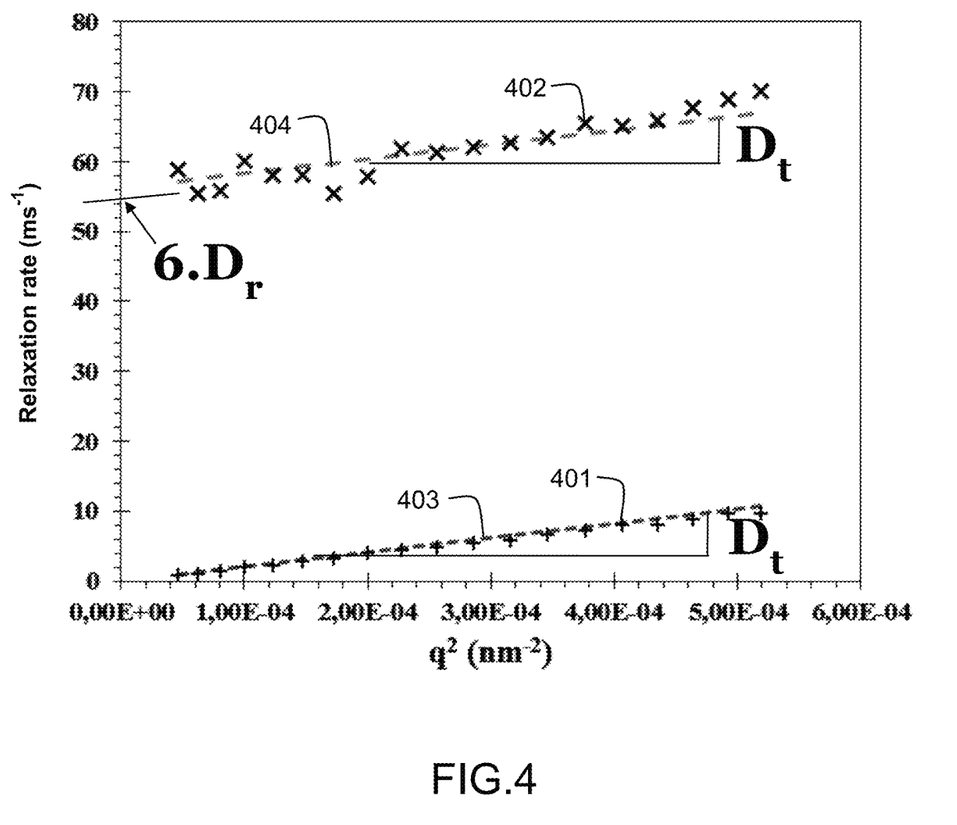
FIG. 4 shows the values of the translational relaxation rate ($\Gamma_t$) and of the sum of the relaxation rates ($\Gamma_t+\Gamma_r$) as a function of the square of the scattering vector ($q^2$), these being determined from correlograms for each angle; a linear approximation of these curves allows the average values of the translational scattering coefficient $D_t$ (slope) and of the rotational scattering coefficient $D_r$ (ordinate at the origin) to be found graphically.

In a second method, a general value of these coefficients may be determined graphically as illustrated in FIG. 4.

To this end, the translational relaxation rate ($\Gamma_t$) (curve 401, FIG. 4) and the sum of the relaxation rates ($\Gamma_t+\Gamma_r$) (curve 402, FIG. 4) are drawn as a function of $q^2$.

These two curves may be fitted with parallel straight lines of respective equations:

$$\Gamma_t=D_t\times q^2$$

$$\Gamma_t+\Gamma_r=D_t\times q^2+6D_r$$

The values of the scattering coefficients may therefore be read graphically, with $D_t$, the (identical) slope of the straight lines, which slope is preferably measured on the curve of $\Gamma_t$ for a better accuracy; and $D_r$, $\frac{1}{6}^{th}$ of the ordinate at the origin of the curve $\Gamma_t+\Gamma_r$. It will be noted that the example thus described uses a temporal autocorrelation of the signal; nevertheless, it is possible to obtain the translational and rotational scattering coefficients from a spectral analysis (FFT) of the signal (using the width of a peak in a frequency spectrum obtained by fast Fourier transform of the signal).

Finally, the characteristic parameters of the dimensions of the nanoparticles are determined (step 214) from said two translational and rotational scattering coefficients ($D_t$, $D_r$).

The length (L) of the particles and the aspect ratio factor (RF) are determined by applying the following relationships:

$$L = (a \times Y^{4/3})/(b \times Y - c \times Y^{1/3} \times X)/D_r^{1/3}$$

$$RF = L/\Phi = e \times \exp(f \times Y^{-2/3} \times X) \quad \text{[Math 6]}$$

where X is the ratio of the translational scattering coefficient to the cube root of the rotational scattering coefficient and Y is the ratio of the absolute temperature (in kelvin) to the viscosity of the carrier liquid (in milliPascal per second or centipoise), and a, b, c, e and f are constants independent of the sample and of the experimental conditions (eg temperature) and the values of which are the following:

$$a = 1.29714 \times 10^{-32}$$

$$b = 1.33796 \times 10^{-24}$$

$$c = 6.69743 \times 10^{-9}$$

$$e = 3.35889 \times 10^{-2}$$

$$f = 4.12937 \times 10^{16} \quad \text{[Math 7]}$$

In particular, the variable $X = D_t/(\sqrt[3]{D_r})$ is directly related to the values of the scattering coefficients computed beforehand.

The applicants have thus demonstrated experimentally the accuracy of the results obtained by virtue of the devices and method according to the present description.

TABLE 1

| Angle (°) | $R_F = L/\Phi$ | Length L (nm) | Diameter $\Phi$ (nm) | Error (with respect to a TEM image) |
|---|---|---|---|---|
| 55 | 2.66 | 29.29 | 11.03 | 10% |
| 60 | 1.68 | 26.19 | 15.60 | >20% |
| 65 | 2.95 | 29.88 | 10.11 | 5% |
| 70 | 3.90 | 32.12 | 8.23 | 20% |
| 75 | 4.03 | 32.31 | 8.02 | 20% |
| Average value | 3.0 | 30.0 | 10.6 | 13.75% |
| Standard deviation | 1.0 | 2.5 | 3.1 | 8.9% |
| Multi-angle graphical method (FIG. 4) | 2.6 | 29.5 | 11.25 | 10% |
| Electron microscope (TEM) | 3 | 31 | 10 | |

The above table shows that the analyzing method implemented in the invention by means of the device such as described in the present description allows the two dimensions of length and diameter (or their ratio in this example of gold nanorods) to be determined with a minimum error of 5% with respect to the values measured in transmission electron micrographs of the same sample. It may also be seen that there is an optimal angle for maximizing measurement accuracy, here equal to 65°.

Although described by way of a certain number of exemplary embodiments, the devices and methods comprise various variants, modifications and improvements that will appear obvious to those skilled in the art, it being understood that these various variants, modifications and improvements form part of the scope of the invention such as defined in the following claims.

REFERENCES

Ref. 1.: U.S. Pat. No. 8,854,621.
Ref. 2.: J. Rodriguez-Fernandez et al. "*Dynamic Light Scattering of Short Au Rods with Low Aspects Ratio*", J. Phys. Chem. C 2007, 111, 5020-5025
Ref. 3: Alexander D. Levin*v, "*Nonspherical nanoparticles characterization using partially depolarized dynamic light scattering*" Modeling Aspects in Optical Metrology V, edited by Bernd Bodermann, Karsten Frenner, Richard M. Silver, Proc. of SPIE Vol. 9526, 95260P
Ref. 4: T. Ohsawa et al. (1983) "*FFT method of dynamic light scattering for particle size diagnostics in luminous flames*", Combustion and Flame, 53(1-3), 135-139.

The invention claimed is:

1. A device for determining characteristic parameters of the dimensions of nanoparticles in suspension in a liquid medium, comprising:
   light-emitting means configured to emit an incident light beam that is linearly polarized along a polarization axis;
   a detecting unit comprising a measurement arm that is rotatable with respect to an axis of rotation, wherein said detecting unit is configured for optical detection of a plurality of beams scattered at a plurality of scattering angles, when the sample is illuminated by the incident beam, and comprises:
      a first detection channel with a first optical axis and
      a second detection channel with a second optical axis, the first and second detection channels being separated by a polarization-splitting element arranged in said measurement arm;
   a fixed sample holder, configured to receive a container of cylindrical symmetry, inside of which is located a sample of said nanoparticles in suspension, the sample holder being arranged such that, in operation, an axis of symmetry of the container is coincident with the axis of rotation of the measurement arm;
   a control unit; wherein:
   the polarization-splitting element of the measurement arm is configured to simultaneously send, for each scattering angle of said plurality of scattering angles:
      in the first detection channel, a first polarized component of the beam scattered by the sample at said scattering angle, said first component being linearly polarized with a polarization axis collinear with said polarization axis of the incident beam;
      in the second detection channel, a second polarized component of the beam scattered by the sample at said scattering angle, said second component being linearly polarized with a polarization axis perpendicular to said polarization axis of the incident beam; and
   the control unit is configured to determine, from signals corresponding to the polarized components detected in each of the detection channels as a function of time, and for said plurality of scattering angles, at least two characteristic parameters of the dimensions of the nanoparticles.

2. The device according to claim 1, wherein the plurality of scattering angles is comprised in a range of scattering angles extending from 20° to 160°.

3. The device according to claim 1, wherein the rotation of said measurement arm is automated and controlled by said control unit.

4. The device according to claim 1, wherein said detection channels are optical fibered.

5. A method for determining characteristic parameters of the dimensions of anisotropic nanoparticles in suspension in a liquid medium, comprising:
- arranging a sample of said nanoparticles in liquid suspension in a container of cylindrical symmetry;
- illuminating said sample by means of an incident light beam that is linearly polarized along a polarization axis;
- simultaneously detecting, by means of a measurement arm that is rotatable with respect to an axis of rotation that is coincident with an axis of symmetry of the container, and for each scattering angle of a plurality of scattering angles, two polarized components of the beam scattered by the sample at said scattering angle, the two polarized components respectively having two polarization axes that are perpendicular, one of said polarization axes being collinear with said polarization axis of the incident beam;
- determining, from signals corresponding to the detected polarized components as a function of time, for said plurality of scattering angles, at least two characteristic parameters of the dimensions of the nanoparticles.

6. The method according to claim 5, wherein said characteristic parameters of the dimensions of the nanoparticles comprise at least two parameters among: a length, a width, an aspect ratio, a diameter, a height, a thickness, a major-axis length, a minor-axis length.

7. The method according to claim 5, wherein the plurality of scattering angles is comprised in a range of scattering angles extending from 20° to 160°.

8. The method according to claim 5, wherein the determination of at least two characteristic parameters of the dimensions of the nano-objects comprises determining two translational and rotational scattering coefficients.

9. The method according to claim 8, wherein the determination of the two translational and rotational scattering coefficients comprises, for each scattering angle, determining two translational and rotational relaxation rates.

10. The method according to claim 9, wherein the determination of two translational and rotational relaxation rates comprises, for said scattering angle:
- determining two correlograms corresponding to the fluctuations in the intensity of said two polarized components as a function of time;
- determining, from said correlograms, said translational and rotational relaxation rates.

11. The method according to claim 10, wherein the two translational and rotational relaxation rates are determined from a fit of curves respectively resulting from the sum and subtraction of the two correlograms.

12. The method according to claim 8, wherein said translational and rotational scattering coefficients are determined graphically from translational and rotational relaxation rates obtained for said plurality of scattering angles.

13. The method according to claim 8, wherein the determination of said at least two characteristic parameters of the dimensions of the nanoparticles comprises determining a length and an aspect ratio of said nanoparticles, computed via an empirical law, said empirical law being dependent on a variable equal to the ratio of the translational scattering coefficient to the cube root of the rotational scattering coefficient.

* * * * *